US011539678B2

(12) United States Patent
Ruiz

(10) Patent No.: US 11,539,678 B2
(45) Date of Patent: Dec. 27, 2022

(54) ASYMMETRIC KEY MANAGEMENT FOR CLOUD COMPUTING SERVICES

(71) Applicant: RED HAT, INC., Raleigh, NC (US)

(72) Inventor: Alberto Ruiz Ruiz, Las Palmas de Gran Canaria (ES)

(73) Assignee: Red Hat, Inc., Raleigh, NC (US)

( * ) Notice: Subject to any disclaimer, the term of this patent is extended or adjusted under 35 U.S.C. 154(b) by 466 days.

(21) Appl. No.: 16/542,846

(22) Filed: Aug. 16, 2019

(65) Prior Publication Data

US 2021/0051137 A1    Feb. 18, 2021

(51) Int. Cl.

| H04L 29/06 | (2006.01) |
| H04L 9/40 | (2022.01) |
| G06F 16/248 | (2019.01) |
| G06F 16/22 | (2019.01) |
| H04L 67/10 | (2022.01) |
| H04L 9/30 | (2006.01) |
| H04L 41/0806 | (2022.01) |
| H04L 41/22 | (2022.01) |

(52) U.S. Cl.
CPC ...... H04L 63/0442 (2013.01); G06F 16/2282 (2019.01); G06F 16/248 (2019.01); H04L 9/3073 (2013.01); H04L 41/0806 (2013.01); H04L 41/22 (2013.01); H04L 63/062 (2013.01); H04L 67/10 (2013.01)

(58) Field of Classification Search
CPC ............... H04L 63/0442; H04L 9/3073; H04L 41/0806; H04L 41/22; H04L 63/062; H04L 67/10; H04L 67/1097; H04L 9/0894; G06F 16/2282; G06F 16/248
See application file for complete search history.

(56) References Cited

U.S. PATENT DOCUMENTS

| 9,350,536 | B2* | 5/2016 | Sabin ............... H04L 9/0894 |
| 9,608,810 | B1* | 3/2017 | Ghetti ............... H04L 63/102 |
| 9,785,928 | B1* | 10/2017 | Brandwine ......... G06F 9/45533 |
| 10,050,951 | B2 | 8/2018 | Mathaiyan et al. |
| 11,101,996 | B2* | 8/2021 | Canillas ............... G06F 21/72 |

(Continued)

OTHER PUBLICATIONS

Ruostemaa, J. "Managing SSH Keys" downloaded https://upcloud.com/community/tutorials/managing-ssh-keys/, 5 pages.

(Continued)

Primary Examiner — Michael Won
(74) Attorney, Agent, or Firm — Lowenstein Sandler LLP

(57) ABSTRACT

A key manager receives one or more asymmetric key pairs associated with a user to be associated with remote access of cloud computing resources, selects a first asymmetric key pair of the one or more asymmetric key pairs, determines one or more cloud service providers associated with the user, selects a first cloud service provider of the one or more cloud service providers to be associated with the first asymmetric key pair, determines one or more cloud service components associated with the first cloud service provider that are accessible to the user, provisions at least one of the one or more cloud service components with the first public key, and configures a connection component to establish a secure connection to the at least one of the one or more cloud service components using the first private key.

20 Claims, 5 Drawing Sheets

(56) References Cited

U.S. PATENT DOCUMENTS

| | | | |
|---|---|---|---|
| 2003/0081784 A1* | 5/2003 | Kallahalla | H04L 9/0833 |
| | | | 380/277 |
| 2005/0152542 A1* | 7/2005 | Zheng | H04L 9/3213 |
| | | | 380/30 |
| 2006/0020679 A1* | 1/2006 | Hinton | H04L 63/0815 |
| | | | 709/217 |
| 2011/0154025 A1* | 6/2011 | Spalka | H04L 9/3236 |
| | | | 713/182 |
| 2012/0011578 A1* | 1/2012 | Hinton | H04L 9/3228 |
| | | | 726/8 |
| 2013/0007845 A1* | 1/2013 | Chang | H04L 63/104 |
| | | | 726/4 |
| 2014/0278623 A1* | 9/2014 | Martinez | G06Q 10/06 |
| | | | 705/7.12 |
| 2014/0283010 A1* | 9/2014 | Rutkowski | H04L 9/088 |
| | | | 726/18 |
| 2014/0317716 A1* | 10/2014 | Chao | H04L 63/0815 |
| | | | 726/9 |
| 2015/0019991 A1* | 1/2015 | Kristj Nsson | H04L 41/0853 |
| | | | 715/747 |
| 2015/0128221 A1* | 5/2015 | Cao | H04L 63/06 |
| | | | 726/4 |
| 2015/0180860 A1* | 6/2015 | Klieman | H04L 63/062 |
| | | | 713/156 |
| 2016/0241558 A1 | 8/2016 | Adam et al. | |
| 2016/0302061 A1* | 10/2016 | Park | H04L 9/0866 |
| 2017/0041303 A1 | 2/2017 | Trimmer et al. | |
| 2017/0272413 A1* | 9/2017 | Adams | H04W 12/086 |
| 2018/0007059 A1* | 1/2018 | Innes | G06F 21/6218 |
| 2018/0113999 A1 | 4/2018 | Azmat | |
| 2018/0157825 A1* | 6/2018 | Eksten | H04L 9/3239 |
| 2018/0167367 A1* | 6/2018 | John | H04L 9/3247 |
| 2018/0329693 A1* | 11/2018 | Eksten | G06F 16/21 |
| 2019/0020647 A1* | 1/2019 | Sinha | H04L 63/0407 |
| 2019/0058594 A1* | 2/2019 | Kludy | H04L 9/321 |
| 2019/0075134 A1 | 3/2019 | Ylonen | |
| 2019/0372758 A1* | 12/2019 | Tevosyan | H04L 9/3213 |
| 2020/0275357 A1* | 8/2020 | Bordeleau | H04W 48/18 |
| 2021/0051137 A1* | 2/2021 | Ruiz | H04L 67/10 |
| 2021/0099311 A1* | 4/2021 | Saponaro | H04L 9/3247 |

OTHER PUBLICATIONS

Plesk International GmbH (May 28, 2019) "SSH Keys Manager" downloaded https://www.plesk.com/extensions/ssh-keys/,2 pages.

* cited by examiner

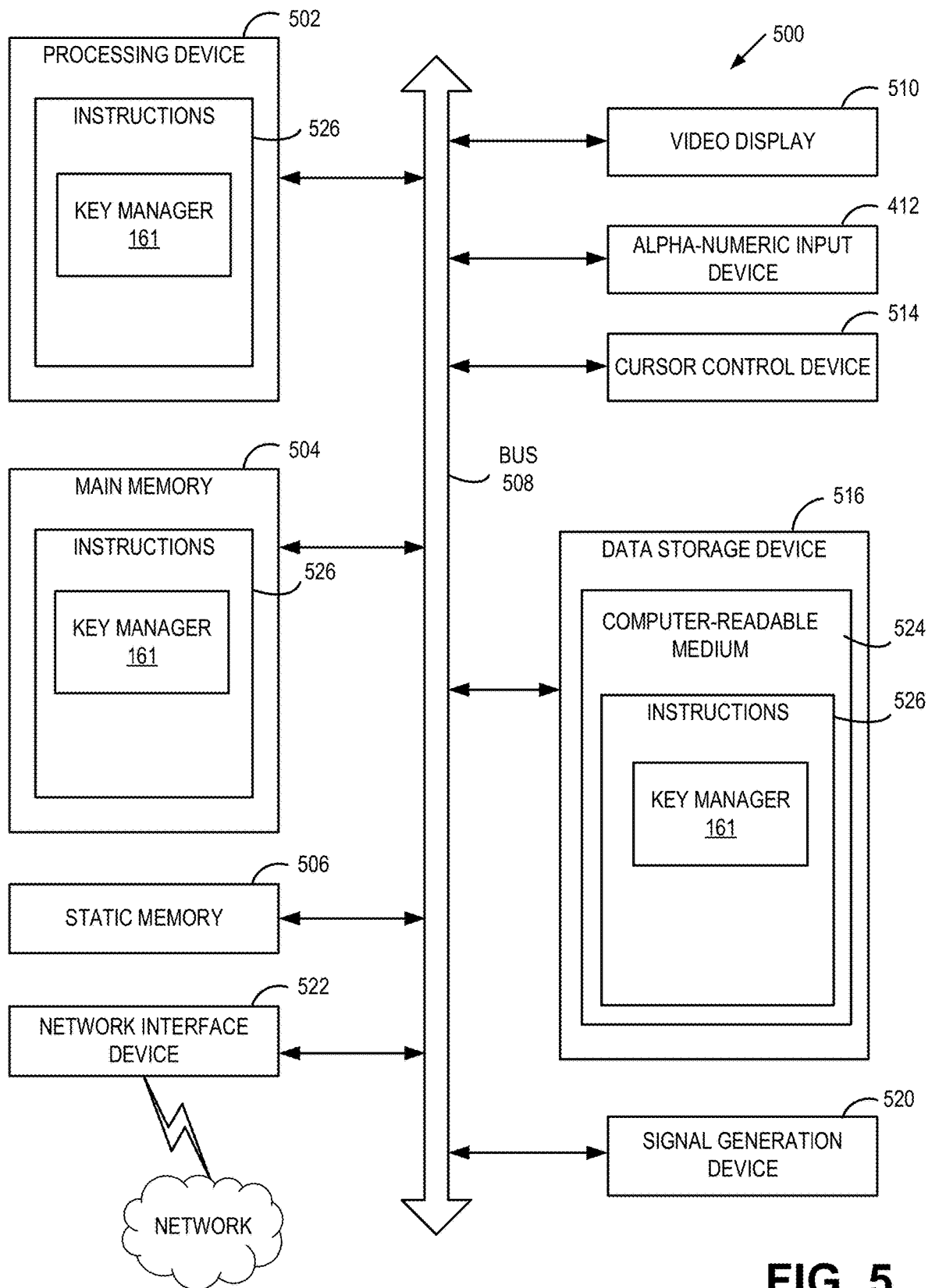

ASYMMETRIC KEY MANAGEMENT FOR CLOUD COMPUTING SERVICES

TECHNICAL FIELD

The present disclosure is generally related to computer systems, and more particularly, to asymmetric key management for cloud computing systems.

BACKGROUND

Platform-as-a-Service (PaaS) system offerings can include software and/or hardware facilities for facilitating the execution of web applications in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) hosted on its computer hardware available to customers for this purpose. The cloud provider can provide an interface that a user can use to requisition virtual machines and associated resources such as security policies, processors, storage, and network services, etc., as well as an interface to install and execute the user's applications and files on the virtual machines.

PaaS offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which:

FIG. 5 depicts a block diagram of an illustrative computer system operating in accordance with one or more aspects of the present disclosure.

DETAILED DESCRIPTION

Figure 1:
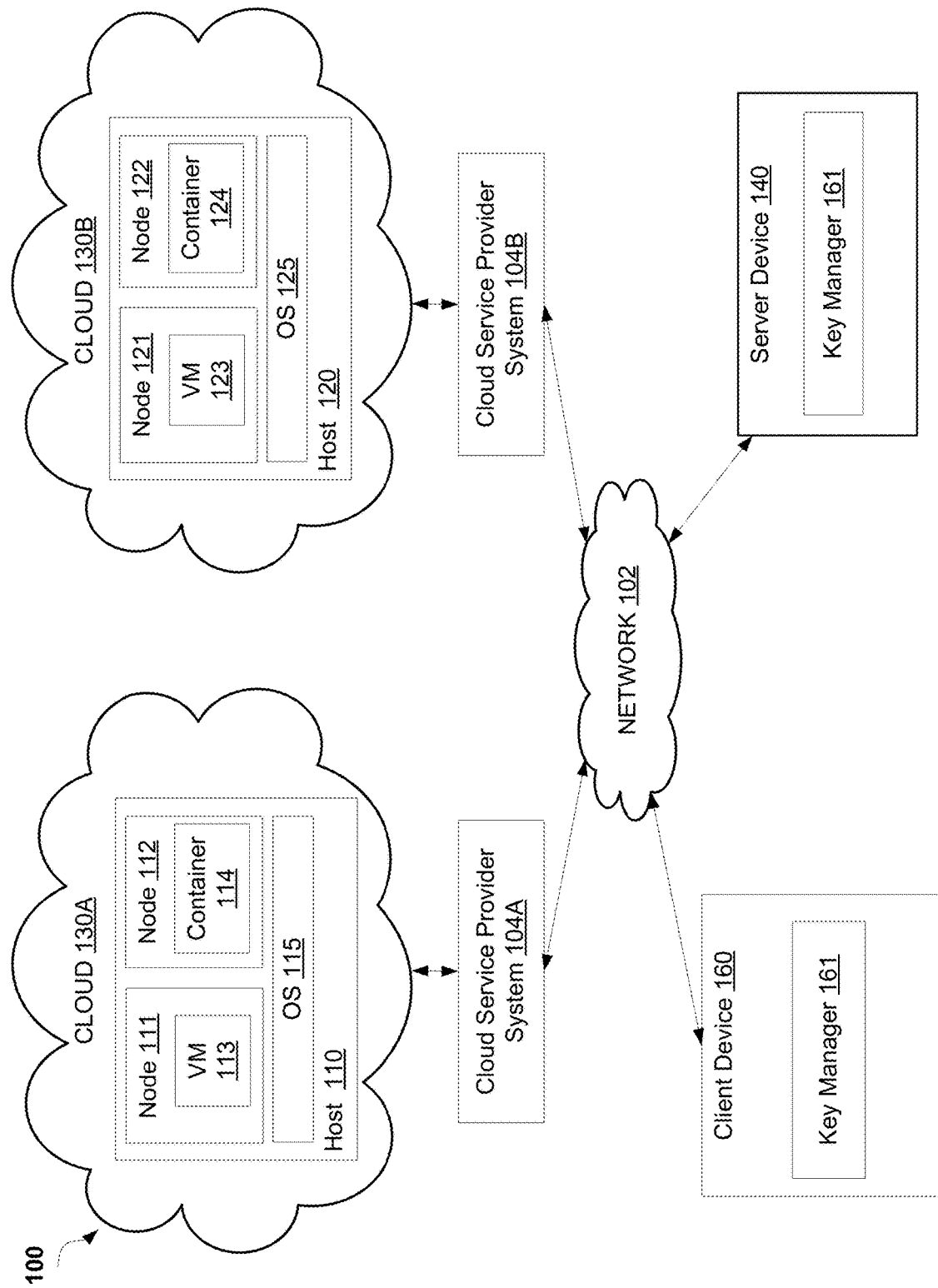
FIG. 1 depicts a high-level component diagram of an example computer system architecture, in accordance with one or more aspects of the present disclosure.

Described herein are methods and systems for asymmetric key management for cloud computing systems in a cloud computing environment. Cloud computing environments provide many advantages over locally owned computing systems. For example, cloud computing environments can optimize resources by sharing them across multiple users and multiple clients, thereby reducing costs otherwise dedicated to procuring and maintaining local hardware. Additionally, cloud computing environments provide improved scalability for clients. Instead of purchasing additional local computing resources, supporting more data storage and buying more software licenses to support growth in the business, users can rent more storage space, acquire more bandwidth and increase access to software programs which are controlled by a cloud computing provider. Cloud computing environments, however, can present challenges to developers and administrators who maintain an application across multiple nodes of a cloud provider system and/or multiple cloud computing systems. In some instances, a user who maintains a cloud based application may interact with many cloud service components (e.g., virtual machines (VMs), containers, projects, etc.) within a single cloud provider system, each with separate authentication credentials. This can often involve the user re-authenticating (e.g., reentering a user id and password) each time that user makes a software or configuration change to a cloud service component used by an application.

Some conventional cloud computing environments mitigate issues with repetitive authentication by implementing asymmetric cryptography protocols. Asymmetric cryptography uses public and private keys to encrypt and decrypt data. The keys are asymmetric in that they are large numbers that have been paired together but are not identical. The public key may be shared with everyone while the private key is kept secret by the application developer, owner, or administrator. The asymmetric key pair can be used to manage secure access to the cloud service components (e.g., the VM, container, or groups of VMs or containers) via a secure connection (e.g., a secure shell (SSH) connection). The public key may be provided to the cloud service provider so that the applicable cloud service component may be provisioned with the public key to allow the user remote access to the component without requiring the manual entry of security credentials. These types of authentication protocols, however, can often lead to operational inefficiencies since they typically do not allow for configuration of a secure connection (e.g., a secure shell connection) to the provisioned cloud service component. In conventional systems, the user is often tasked with manually configuring a local secure connection to access the remote cloud service component using the appropriate private key. In implementations involving large numbers of cloud service components, this can pose security risks to the management of the environment and increased authentication failures when keys are not mapped to the correct component.

Aspects of the present disclosure address the above noted and other deficiencies by implementing a key manager (e.g., as a computer program or a computer program component) to facilitate asymmetric key management for cloud computing services of a cloud computing environment. The key manager can present a graphical user interface (GUI) to the user of a client device that presents any asymmetric key pairs associated with that user for provisioning to any cloud service component to which that user has authentication credentials. The user may select an available key pair, at which point the key manager can identify cloud service provider systems to which that user has authentication credentials. The key manager can then retrieve a list of cloud service components from a selected cloud service provider system to allow the user to provision selected components with the selected key pair. Once the components are provisioned with the public key, the key manager can automatically configure a connection component (e.g., a secure shell (SSH) connection component) to provide secure access to the cloud service components using the private key of the selected key pair.

Aspects of the present disclosure present advantages over conventional solutions to the issues noted above. First, the key manager of the present disclosure provides the ability to streamline the provisioning of large numbers of cloud service components for a single cloud service provider. This can significantly improve the efficiency of provisioning cloud resources and configuring secure remote access to those resources. Thus, the negative consequences of improperly configured key pairs can be dramatically reduced. Additionally, the key manager of the present disclosure can be implemented so that it is agnostic with respect to any one cloud service provider. Thus, multiple cloud service providers may be supported concurrently allowing a single key pair that may be provisioned to cloud service components across any of the cloud service providers using a single interface. This can provide a more flexible and efficient authentication implementation system since the user can utilize a single interface to maintain resources from multiple sources.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as OpenShift®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes one or more cloud-computing environment 130A, 130B (also referred to herein as a cloud(s)) that includes nodes 111, 112, 121, 122 to execute applications and/or processes associated with the applications. A "node" providing computing functionality may provide the execution environment for an application of the PaaS system. In some implementations, the "node" may include a virtual machine (VMs 113, 123) that is hosted on a physical machine, such as host 110, 120 implemented as part of the clouds 130A, 130B. For example, nodes 111 and 112 are hosted on physical machine of host 110 in cloud 130A provided by cloud provider 104A. Similarly, nodes 121 and 122 are hosted on physical machine of host 120 in cloud 130B provided by cloud provider 104B. In some implementations, nodes 111, 112, 121, and 122 may additionally or alternatively include a group of VMs, a container (e.g., container 114, 124), or a group of containers to execute functionality of the PaaS applications. When nodes 111, 112, 121, 122 are implemented as VMs, they may be executed by operating systems (OSs) 115, 125 on each host machine 110, 120. It should be noted, that while two cloud providers systems have been depicted in FIG. 1, in some implementations more or fewer cloud service provider systems 104 (and corresponding clouds 130) may be present.

In some implementations, the host machines 110, 120 can be located in data centers. Users can interact with applications executing on the cloud-based nodes 111, 112, 121, 122 using client computer systems (not pictured), via corresponding client software (not pictured). Client software may include an application such as a web browser. In other implementations, the applications may be hosted directly on hosts 110, 120 without the use of VMs (e.g., a "bare metal" implementation), and in such an implementation, the hosts themselves are referred to as "nodes".

In various implementations, developers, owners, and/or system administrators of the applications may maintain applications executing in clouds 130A, 130B by providing software development services, system administration services, or other related types of configuration services for associated nodes in clouds 130A, 130B. This can be accomplished by accessing clouds 130A, 130B using an application programmer interface (API) within the applicable cloud service provider system 104A, 104B. In some implementations, a developer, owner, or system administrator may access the cloud service provider system 104A, 104B from a client device (e.g., client device 160) that includes dedicated software to interact with various cloud components. Additionally, or alternatively, the cloud service provider system 104A, 104B may be accessed using a web-based or cloud-based application that executes on a separate computing device (e.g., server device 140) that communicates with client device 160 via network 102.

Client device 160 is connected to hosts 110 in cloud 130A and host 120 in cloud 130B and the cloud service provider systems 104A, 104B via a network 102, which may be a private network (e.g., a local area network (LAN), a wide area network (WAN), intranet, or other similar private networks) or a public network (e.g., the Internet). Each client 160 may be a mobile device, a PDA, a laptop, a desktop computer, a tablet computing device, a server device, or any other computing device. Each host 110, 120 may be a server computer system, a desktop computer or any other computing device. The cloud service provider systems 104A, 104B may include one or more machines such as server computers, desktop computers, etc. Similarly, server device 140 may include one or more machines such as server computers, desktop computers, etc.

In some implementations, the client device 160 may include a key manager 161 that implements asymmetric key management for developers, owners, administrators, etc. of the cloud-based PaaS system described above. As noted above, asymmetric cryptography uses public and private keys to encrypt and decrypt data. The keys are asymmetric in that they are large numbers that have been paired together but are not identical. The public key may be shared with everyone while the private key is kept secret by the application developer, owner, or administrator. The asymmetric key pair can be used to manage secure access to the cloud service components (e.g., the VM, container, or groups of VMs or container) via a secure connection (e.g., a secure shell (SSH) connection). The public key may be provided to the cloud service provider so that the applicable cloud service component may be provisioned with the public key to allow the user access to the component without requiring the manual entry of security credentials. The secure connection may then be configured with the corresponding private key to provide the secure connection to the component provisioned with that private key's counterpart public key.

Key manager 161 can receive, generate, or otherwise maintain one or more asymmetric key pairs associated with a user of client device 160. Key manager 161 can provide a graphical user interface (GUI) that displays a list of the asymmetric key pairs associated with the user of the client device. The user may interact with the GUI to cause key manager 161 to select one of the key pairs from the list to be associated with remote access to one or more of the cloud service components of clouds 130A, 130B. Once a key is selected, key manager 161 can then determine one or more of cloud service providers 104A, 104B associated with the user. For example, key manager 161 can determine which of service providers 104A, 104B for which the user maintains access credentials (e.g., a userid and password). Subsequently, key manager 161 can select a cloud service provider 104A, 104B to be associated with the selected asymmetric key pair. In some implementations, key manager 161 can provide a list of cloud service providers available to the user for display by the GUI. The user may then select one or more of the available providers displayed in the GUI.

Key manager 161 may then determine one or more cloud service components associated with the selected cloud service provider that are accessible to the user. In some implementations, key manager 161 can send a request to the selected cloud service provider system 104A, 104B for a list of cloud service components (VMs, containers, etc.) using the user's access credentials. The selected cloud service provider system can determine those components associated with the user and send a response back to key manager 161. Subsequently, key manager 161 can provide the list received from the cloud service provider system for display by the GUI. The user may use the GUI to select any of the available cloud service components that are to be associated with the asymmetric key pair.

Key manager 161 may subsequently provision the selected cloud service components with the public key of the selected asymmetric key pair. In some implementations, key manager 161 may send the public key to the selected cloud service provider system 104A, 104B with additional information that the cloud service provider can use to identify the selected cloud service components. For example, key manager 161 can send a request to the cloud service provider system using the cloud service provider system's API that includes the key and the additional information. The cloud service provider system may then, after receiving the request, associate the public key with the selected cloud service components. For example, cloud service provider system 104A may receive the public key with information that identifies VM 113 (e.g., a process number, an IP address, or other similar information used by the cloud service provider system to uniquely identify the cloud service component) and associate the public key with VM 113.

The cloud service provider system may then return a response to key manager 161 that indicates whether the public key has been successfully associated with the requested cloud service component. Responsive to determining that the response indicates that the public key was successfully associated with the cloud service component, key manager 161 can configure a connection component (e.g., a SSH connection component) of client device 160 to establish a secure connection to the cloud service component. Key manager 161 can configure the SSH connection component to establish the secure connection using the private key that is associated with the public key used to provision the cloud service component. For example, if VM 113 was provisioned with public key 123, key manager 161 can determine the corresponding private key for public key 123 and configure the SSH component to use that private key to establish the secure connection to VM 113.

As described above, key manager 161 may be an application that executes entirely on client device 160. In other implementations, key manager 161 may function in whole or in part on server device 140. In such instances, key manager 161 can function as a web-based or cloud-based application that is accessible to the user via a web browser or thin-client user interface that executes on client device 160. In some implementations, a portion of key manager 161 may execute on client device 160 and another portion of key manager 161 may execute on server device 140. For example, the storage and maintenance of a user's asymmetric keys may be provided by the portion of key manager 161 executed on client device 160, while the management of the APIs for available cloud service provider systems may be centrally managed by the portion of key manager 161 executed by server device 140. Key manager 161 is described in further detail below with respect to FIG. 2.

While aspects of the present disclosure describe the key manager 161 as implemented in a PaaS environment, it should be noted that in other implementations, the security profile manager can also be implemented in an Infrastructure-as-a-Service (Iaas) environment, such as such as Red Hat OpenStack®.

Figure 2:
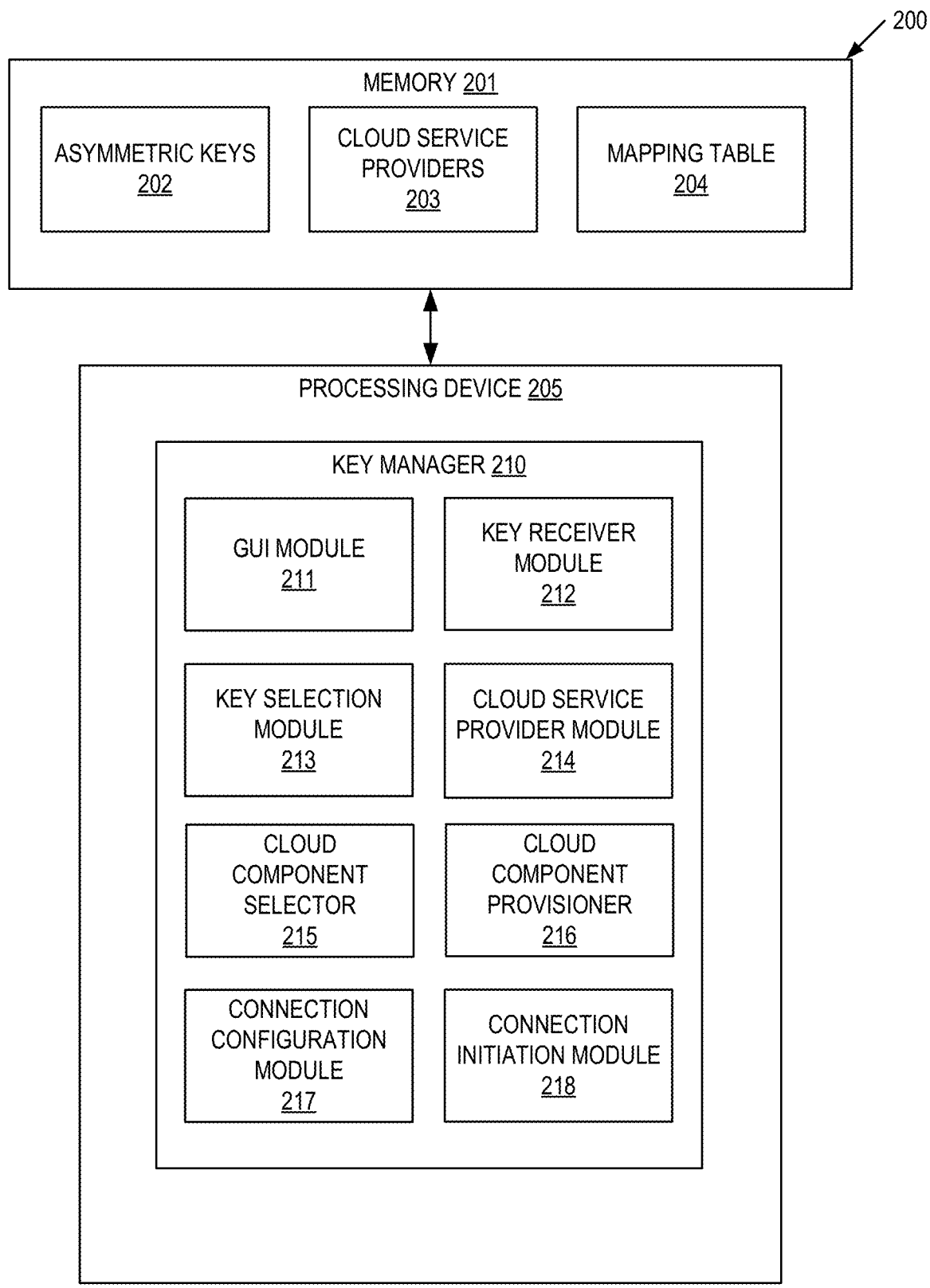
FIG. 2 depicts a block diagram illustrating an example of a key manager, in accordance with one or more aspects of the present disclosure.

FIG. 2 depicts a block diagram illustrating an example of a key manager 210 for facilitating asymmetric key management for cloud computing services of a cloud computing environment. In some implementations, key manager 210 may correspond to key manager 161 of FIG. 1. As shown in FIG. 2, key manager 210 may be a component of a computing apparatus 200 that includes a processing device 205, operatively coupled to a memory 201, to execute key manager 210. In some implementations, processing device 205 and memory 201 may correspond to processing device 502 and main memory 504 respectively as described below with respect to FIG. 5.

Key manager 210 may include graphical user interface (GUI) module 211, key receiver module 212, key selection module 213, cloud service provider module 214, cloud component selector 215, cloud component provisioner 216, connection configuration module 217, and connection initiation module 218. Alternatively, the functionality of one or more of GUI module 211, key receiver module 212, key selection module 213, cloud service provider module 214, cloud component selector 215, cloud component provisioner 216, connection configuration module 217, and connection initiation module 218 may be combined into a single module or divided into multiple sub-modules.

GUI module 211 is responsible for providing a GUI for display by a client device (e.g., client device 160 of FIG. 1). In various implementations, GUI module 211 may be invoked to provide information for display to the user at various points during operation of key manager 210. GUI module 211 may operate to provide a dedicated user interface for key manager 210 on a mobile device, desktop device, laptop device, or the like. Alternatively, in implementations where key manager 210 executes at least in part on a server device as described above with respect to FIG. 1, GUI module 211 can provide a user interface via a web browser.

Key receiver module 212 is responsible for receiving one or more asymmetric key pairs associated with a user. As described above, an asymmetric key pair includes a public key and a private key. In various implementations, the received asymmetric key pair is to be associated with remote access to cloud computing resources of a cloud computing system. In some implementations, key receiver module 212 may retrieve the one or more asymmetric key pairs from a storage area. For example, the user may have a library of asymmetric key pairs stored in a storage area of a client device (e.g., a hard drive, a memory space, flash drive, or the like) such as asymmetric keys 202 of memory 201. Alternatively, key receiver module 212 may receive the asymmetric keys from a key management service, a server device, or other connected device or application.

Key selection module 213 is responsible for selecting one or more of the received asymmetric key pairs to be associated with a cloud service provider. In some implementations, key selection module 213 can invoke GUI module 211 to display the received asymmetric key pairs in the GUI. The asymmetric key pairs may be displayed as a list, a grid, or in any similar manner. Subsequently, the user may provide input into the GUI to select a key pair for association with various components of a cloud service provider. GUI module 211 can receive the request to select a particular key pair, update the GUI to indicate that the key pair has been selected, and subsequently forward that request to the key selection module 213 for processing. Key selection module 213 may then select the asymmetric key pair chosen by the user from the list of available asymmetric key pairs.

Cloud service provider module 214 is responsible for determining one or more cloud service providers associated with the user. As noted above, a cloud service provider can be associated with a user when that user has credentials that provide that user access to one or more cloud service components (e.g., VMs, containers, etc.) of that provider. For example, a user may have access to a cloud service provider to configure VMs or containers for the administration or maintenance of a cloud based application that utilizes those components. Cloud service provider module 214 can determine those cloud service providers to which the user has access. In some implementations, key manager 210 can be configured with API sub components or application plugins that provide access to a specific set of cloud service providers (e.g., via APIs specific to those cloud service providers). In such instances, the cloud service providers to which the user has access may be stored in a local data store (e.g., cloud service providers 203 of memory 201). Cloud service provider module 214 can query the data store to generate a list of cloud service providers accessible by the user. Cloud service provider module 214 can then invoke GUI module 211 to provide the list of cloud service providers for display in the GUI.

In some implementations, the cloud service providers supported by key manager 210 may be curated or otherwise maintained by an external server device or connected system. In such instances, cloud service provider module 214 can send a request to the server device (or other connected device or system) for a list of cloud service providers accessible by the user. Cloud service provider module 214 can subsequently receive the list of providers to which the user has access and invoke GUI module 211 to provide the list of cloud service providers for display in the GUI.

GUI module 211 can provide the list of cloud service providers for display as a list, a grid, or in any other similar manner. The user may then provide input into the GUI to select a cloud service provider to which to associate the asymmetric key pair that had been selected earlier by the user. GUI module 211 can receive the request, update the GUI to indicate that the cloud service provider has been selected, and subsequently forward that request to the cloud service provider module 214 for processing. Cloud service provider module 214 may then select the cloud service provider chosen by the user from the list of available cloud service providers.

Cloud component selector 215 is responsible for determining one or more cloud service components associated with the selected cloud service provider that are accessible to the user. In some implementations, cloud component selector 215 identifies the appropriate cloud service provider API sub component or plugin associated with the cloud service provider selected by the user. Subsequently, cloud component selector 215 can send a request to the selected cloud service provider using the identified API sub component or plugin. In various implementations, the request may be for a list of cloud service components of the cloud service provider that are accessible to the user. For example, cloud component selector 215 can send the request to the cloud service provider with information associated with the user (e.g., user authentication credentials) so the cloud service provider can identify those components to which the user has access based on the included authentication credentials. Subsequently, cloud component selector 215 may receive a response from the cloud service provider that includes the list of cloud service components to which the user has access.

Cloud component selector 215 may then invoke GUI module 211 to provide the list of cloud service components for display as a list, a grid, or in any other similar manner. In some implementations, cloud component selector 215 may receive information in the response that indicates whether any of the available components have already been provisioned with the selected asymmetric key. For example, the response provided by the cloud service provider may include a key identifier, an indicator value, a flag, or the like. GUI module 211 may then update the entries in the list to indicate whether the applicable cloud service component has already been associated with the key. The user may provide input into the GUI to select one or more of the cloud service components (e.g., those that have not already been provisioned with the selected key) to which to associate the asymmetric key pair. GUI module 211 can receive the input, update the GUI to indicate that the cloud service components have been selected, and subsequently invoke cloud component provisioner 216 to provision the selected components with the public key of the selected asymmetric key pair.

Cloud component provisioner 216 is responsible for provisioning the selected cloud service components with the public key of the selected asymmetric key pair. In some implementations, cloud component provisioner 216 selects one or more of the cloud service component selected by the user and sends a request to the cloud service provider to associated the public key with the cloud service component. Cloud component provisioner 216 may invoke the cloud service provider API sub component or plug in to configure and send the request according the that service provider's particular API. In some implementations, the request may be sent to the cloud provider with information associated with all of the selected cloud service components (e.g., a list of components). Alternatively, cloud component provisioner 216 may send individual requests for each component.

In some implementations, the request can include the public key as well as information associated with the cloud service component that can direct the cloud service provider to provision the public key to the appropriate component. For example, the request can include a component identifier, IP address, process identifier, or the like. The cloud service provider may store the received public key and maintain an association with the public key and the provisioned cloud component. In some implementations, the cloud service provider may assign a unique identifier associated with the public key and return that identifier to cloud component provisioner 216 for use in future requests. In instances where the public key has been used in a prior provisioning (e.g., the key has been previously used to provision another cloud service component), the request can include the unique identifier assigned to the public key by the cloud service provider.

In some implementations, cloud component provisioner 216 may receive a response from the cloud service provider that indicates whether the selected cloud service component has been successfully associated with the public key. Responsive to determining that the response indicates that the cloud service component has been associated with the public key, cloud component provisioner 216 can invoke GUI module 211 to update the GUI to indicate that the cloud component has been successfully provisioned with the public key. For example, a status indicator may be set to a particular value, a check box may be checked, the list entry may be displayed in a particular color, or the like. In some implementations, responsive to determining that the response indicates that the cloud service component has been associated with the public key, cloud component provisioner 216 can additionally invoke connection configuration module 217.

Connection configuration module 217 is responsible for configuring a connection component (e.g., sub module, plug in, or external process) to establish a secure connection to the selected cloud service component(s) using the private key of the selected asymmetric key pair. For example connection configuration module 217 can configure an SSH connection component to establish an SSH connection. In some implementations connection configuration module 217 may determine location information associated with the selected cloud service component(s). The location information may be an IP address, a location identifier, a process identifier, a domain name system (DNS) name, or the like. In some implementations, connection configuration module 217 can determine this information by sending a request to the cloud service provider. Alternatively, this information may be received by cloud component selector 215 or cloud provisioner 216 in an earlier step of the process and stored in a data store for later use.

Connection configuration module 217 may subsequently generate a mapping table entry that maps the location information of the selected cloud service component to the private key of the selected asymmetric key pair. Connection configuration module 217 may then store the mapping table entry in a data structure of a data store (e.g., mapping table 204 of memory 201). For example, connection configuration module 217 may generate a mapping table entry that maps the IP address of a VM provisioned with a public key to the corresponding private key.

Connection initiation module 218 is responsible for initiating a secure connection (e.g., a secure shell (SSH) connection) to a selected cloud service component using the configuration information stored in the mapping table. In some implementations, connection initiation module 218 may be invoked by the user interacting with the GUI to specifically request the secure connection as part of the provisioning process. In such instances, the GUI module 211 may present a list of provisioned cloud service components, and responsive to receiving a selection by the user, invoke connection initiation module 218 to establish the secure connection (e.g., the SSH connection) directly using the information in the mapping table entry. Alternatively, connection initiation module 218 may be invoked separately from the provisioning process at a later time. In some implementations, a dedicated sub component or system plugin may be used to initiate the secure connection (e.g., an SSH component that initiates an SSH connection) using the configuration information. In such instances, the secure connection may be established separately from key manager 210.

Figure 3:
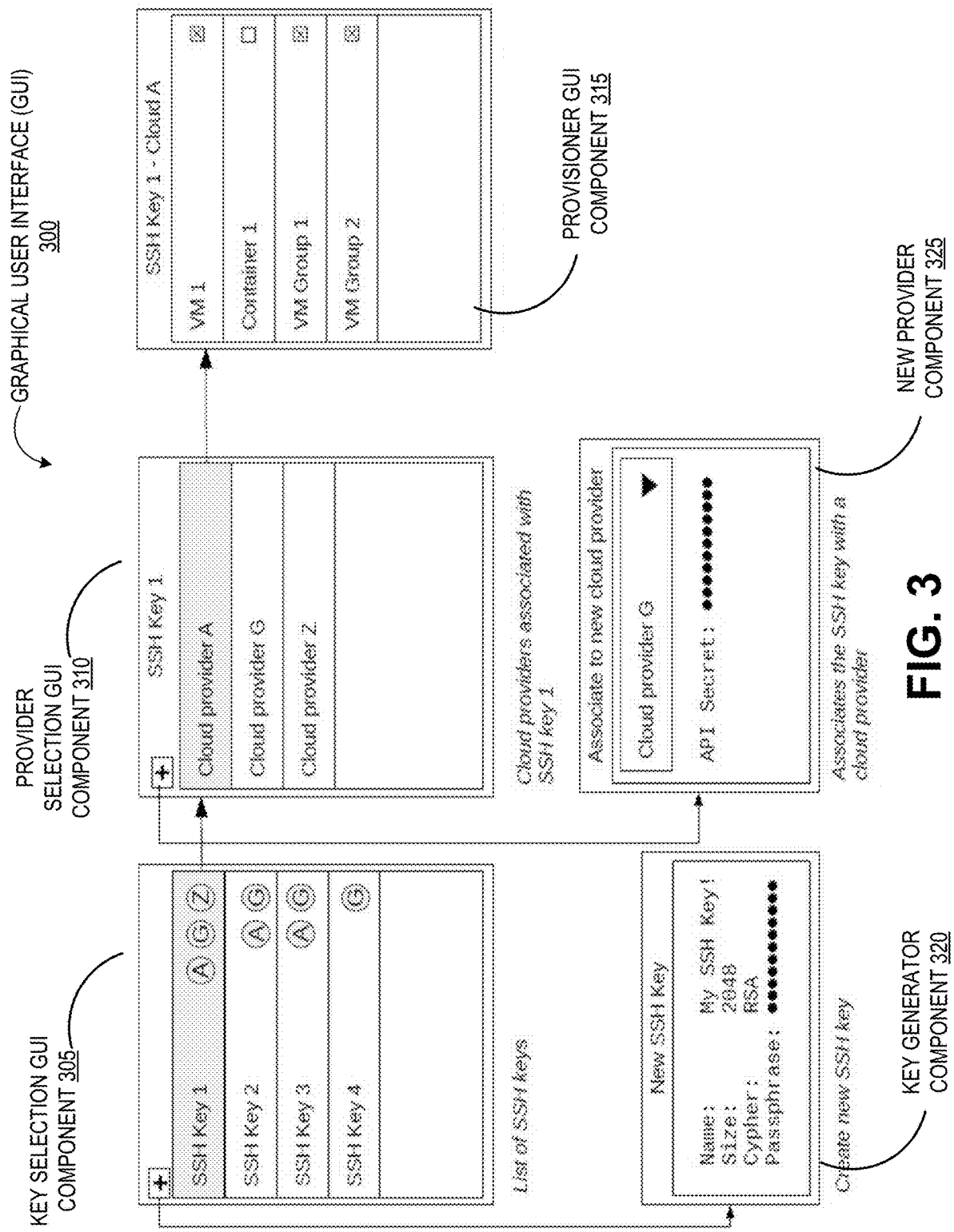
FIG. 3 illustrates a graphical user interface (GUI) for facilitating asymmetric key management for cloud computing services, in accordance with one or more aspects of the present disclosure.

FIG. 3 illustrates an example of a graphical user interface (GUI) 300 for facilitating asymmetric key management for cloud computing services. GUI 300 may be presented by a stand-alone application, a component of a user interface for a key manager, or in any other manner. For example, GUI 300 may be presented to a user by key manager 161 of FIG. 1 or key manager 210 of FIG. 2 as described above.

GUI 300 may present key selection GUI component 305 to a user in order to select one or more asymmetric key pairs to be associated with cloud service components of a cloud service provider. Key selection GUI component 305 may present a list of asymmetric key pairs associated with the user as described above with respect to FIG. 2. As shown in FIG. 3, 4 key pairs are associated with the user of GUI 300 and are displayed as a list in key selection GUI component 305. In various implementations, key selection GUI component 305 can additionally include GUI elements for each key pair that indicate whether a key pair has been previously associated with a cloud provider. For example, as shown in FIG. 3, "SSH Key 1" is associated with cloud service providers "A," "G," and "Z."

The user may select one of the SSH keys displayed in key selection GUI component 305. GUI 300 may then provide the selected key to the key manager to determine the cloud providers available to the user as described above with respect to FIG. 2. GUI 300 may then present provider selection GUI component 310 to the user to display the available cloud service providers. The user may then select one of the cloud service providers which causes GUI 300 to invoke the key manager to retrieve the cloud service components associated with that provider as described above with respect to FIG. 2. GUI 300 may then present provisioner GUI component 315 to the user to display any cloud service components available to the user as well as whether or not each of the components has already been provisioned with the public key of the selected asymmetric key pair.

For example, as shown in FIG. 3, the user has selected "SSH Key 1" to be associated with components of "Cloud provider A." Provisioner GUI component 315 displays the cloud service components for "Cloud A" as well as an element in the GUI that indicates whether each of the components has been provisioned with the public key for "SSH Key 1." As shown, "VM1," "VM Group 1," and "VM Group 2" have been previously provisioned with "SSH Key 1" (depicted by an "x" in a checkbox element for each item on the list), whereas "Container 1" has not been provisioned with "SSH Key 1" (depicted by an empty checkbox). The user may then select the entry for "Container 1" to provision that component with the public key for "SSH Key 1". The key manager may then upload the public key for "SSH Key 1" to the keyring for "Cloud A" using its remote API, causing "Cloud A" to assign the public key to "Container 1." Subsequently, the key manager may also configure the local SSH component to map the private key for "SSH Key 1" to the IP address, DNS name, or other location information associated with "Container 1."

Provisioner GUI component 315 can also provide the user with the ability to remove the association between the selected key one of the listed cloud service components. For example, if the user unchecks the check box associated with "VM 1", the key manager may send a request to "Cloud A" to remove the association between the public key for "SSH Key 1" and "VM1". Subsequently, the key manager may also remove the configuration file entry that associates the private key for "SSH Key 1" to the IP address for "VM 1."

In some implementations, GUI 300 may also present key generator component 320 to provide the user with the ability to generate a new key value pair. As shown, key generator component 320 may provide input fields for the user to enter a key name, key size, cypher type, and passphrase. The key generator component 320 can then invoke a key generator sub component to generate the new key pair and store it in a storage space. GUI 300 may then present key selection GUI component 305 to with the new key added to the list of keys associated with the user.

GUI 300 may also present new provider component 325 to provide the user with the ability to add a new cloud provider to the list of cloud providers presented by provider selection GUI component 310. As shown, new provider component 325 may display a GUI element that allows the user to select an available cloud service provider and provide user credentials to authorize access to the API for that cloud service provider.

Figure 4:
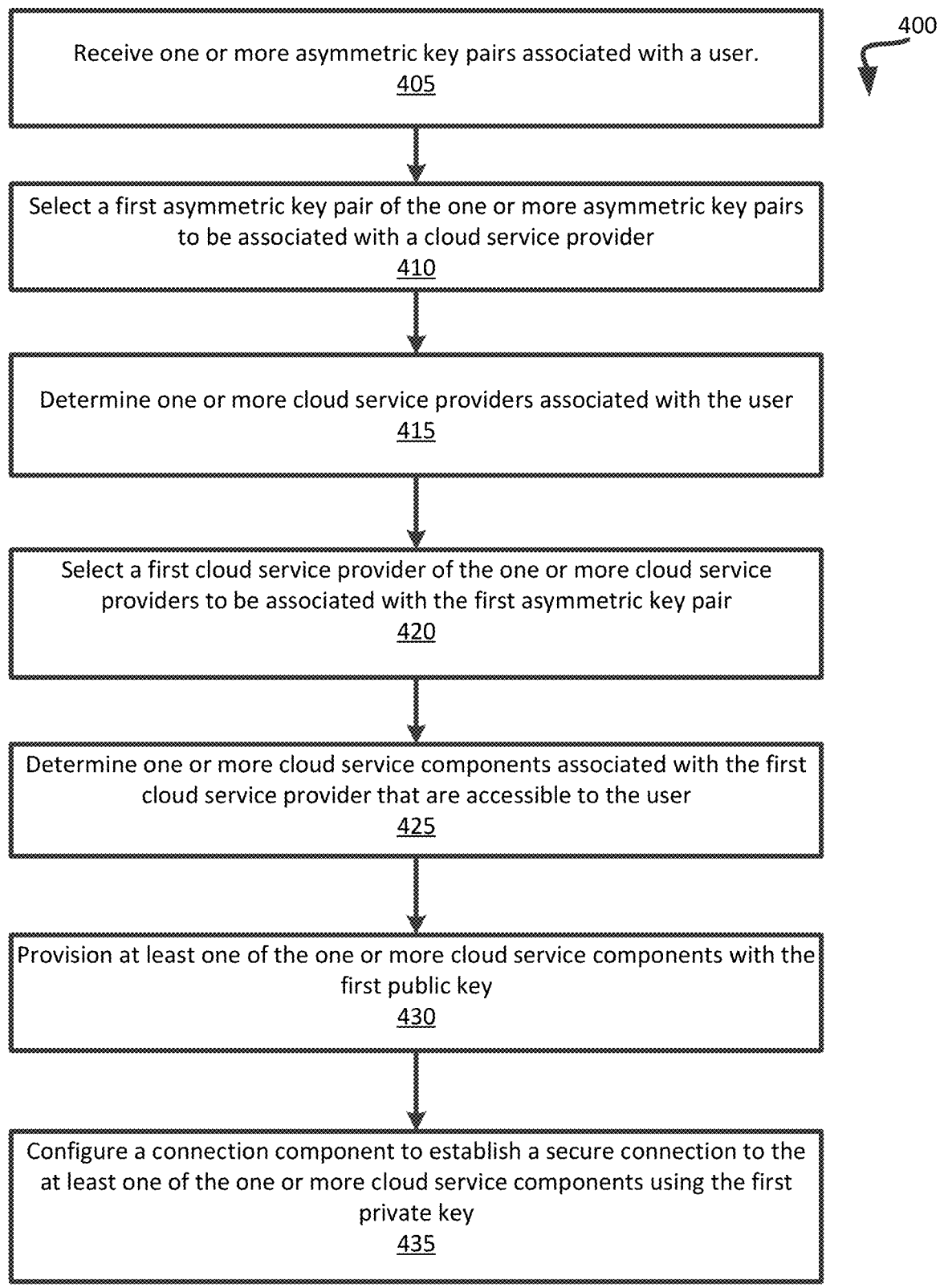
FIG. 4 depicts a flow diagram of a method for facilitating asymmetric key management for cloud computing services, in accordance with one or more aspects of the present disclosure.

FIG. 4 depicts a flow diagram of an example method 400 for facilitating asymmetric key management for cloud computing services. The method may be performed by processing logic that may comprise hardware (circuitry, dedicated logic, etc.), computer readable instructions (run on a general purpose computer system or a dedicated machine), or a combination of both. In an illustrative example, method 400 may be performed by key manager 161 in FIG. 1, or key manager 210 in FIG. 2. Alternatively, some or all of method 400 might be performed by another module or machine. It should be noted that blocks depicted in FIG. 4 could be performed simultaneously or in a different order than that depicted.

At block 405, processing logic receives one or more asymmetric key pairs associated with a user. In some implementations, each of the one or more asymmetric key pairs includes a public key and a private key to be associated with remote access of cloud computing resources. At block 410, processing logic selects a first asymmetric key pair of the one or more asymmetric key pairs to be associated with a cloud service provider. In some implementations, the first asymmetric key pair comprises a first public key and a first private key. At block 415, processing logic determines one or more cloud service providers associated with the user.

At block 420, processing logic selects a first cloud service provider of the one or more cloud service providers to be associated with the first asymmetric key pair. At block 425, processing logic determines one or more cloud service components associated with the first cloud service provider that are accessible to the user. At block 430, processing logic provisions at least one of the one or more cloud service components with the first public key. At block 435, processing logic configures a connection component to establish a secure connection to the at least one of the one or more cloud service components using the first private key. In some implementations, the processing logic configures a secure shell (SSH) connection component to establish the secure connection. After block 435, the method of FIG. 4 terminates.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes key manager 161 for performing the operations and steps discussed herein (e.g., corresponding to the method of FIG. 4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include key manager 161 (e.g., corresponding to the method of FIG. 4, etc.) embodying any one or more of the methodologies or functions described herein. Key manager 161 may also reside, completely or at least partially, within the main memory 504 and/or within the processing device 502 during execution thereof by the computer system 500, the main memory 504 and the processing device 502 also constituting computer-readable media. Key manager 161 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:

receiving, by a processing device, one or more asymmetric key pairs associated with a user, wherein each of the one or more asymmetric key pairs comprises a public key and a private key to be associated with remote access of cloud computing resources;

displaying, in a first graphical interface component of a graphical user interface, the received one or more asymmetric key pairs associated with the user, wherein the graphical user interface comprises the first graphical user interface component and a second graphical user interface component;

selecting based on an input provided in the graphical user interface, from the received one or more asymmetric key pairs displayed in the first graphical user interface component, a first asymmetric key pair of the one or more asymmetric key pairs, wherein the first asymmetric key pair comprises a first public key and a first private key;

determining one or more cloud service providers associated with the user;

selecting, via the second graphical user interface component, a first cloud service provider of the one or more cloud service providers to be associated with the first asymmetric key pair;

determining one or more cloud service components associated with the first cloud service provider that are accessible to the user;

provisioning, by the processing device, at least one of the one or more cloud service components with the first public key; and configuring, by the processing device, a connection component to establish a secure connection to the at least one of the one or more cloud service components using the first private key.

2. The method of claim 1, further comprising:
providing the graphical user interface for display by a client device;
displaying the received one or more asymmetric key pairs associated with the user as a list in the first graphical user interface component; and
receiving, via the graphical user interface, a request to select the first asymmetric key pair from the list displayed in the graphical user interface.

3. The method of claim 2, wherein determining the one or more cloud service providers further comprises:
sending a request to a server device for a list of cloud service providers accessible by the user;
receiving the list of cloud service providers accessible to the user from the server device; and
providing the list of the cloud service providers for display in the graphical user interface.

4. The method of claim 2, wherein determining the one or more cloud service providers further comprises:
querying a data store of cloud service providers to generate a list of cloud service providers accessible by the user; and
providing the list of the cloud service providers for display in the graphical user interface.

5. The method of claim 2, wherein determining the one or more cloud service components associated with the first cloud service provider further comprises:
sending a request to the first cloud service provider for a list of cloud service components of the first cloud service provider that are accessible to the user;
receiving a response from the first cloud service provider comprising the one or more cloud service components; and
providing the list of the cloud service components for display in the graphical user interface.

6. The method of claim 1 wherein the one or more cloud service components comprise at least one of one or more virtual machines or one or more containers.

7. The method of claim 1, wherein provisioning the at least one of the one or more cloud service components with the first public key further comprises:
selecting a first cloud service component from the one or more cloud service components;
sending a request to the first cloud service provider to associate the first public key with the first cloud service component;
receiving a response from the cloud service provider indicating whether the first cloud service component has been associated with the first public key; and
responsive to determining that the response indicates that the first cloud service component has been associated with the first public key, updating the graphical user interface to indicate that the first cloud service component has been associated with the first public key.

8. The method of claim 7, wherein configuring the connection component further comprises:
determining location information associated with the first cloud service component;
generating a mapping table entry that maps the location information to the first private key; and
storing the mapping table entry in a data structure.

9. The method of claim 8, further comprising:
initiating the secure connection to the first cloud service component using the location information and the first private key.

10. A computing apparatus comprising:
a memory; and
a processing device, operatively coupled to the memory, to:
receive one or more asymmetric key pairs associated with a user, wherein each of the one or more asymmetric key pairs comprises a public key and a private key to be associated with remote access of cloud computing resources;
display, in a first graphical interface component of a graphical user interface, the received one or more asymmetric key pairs associated with the user, wherein the graphical user interface comprises the first graphical user interface component and a second graphical user interface component;
select based on an input provided in the graphical user interface, from the received one or more asymmetric key pairs displayed in the first graphical user interface component, a first asymmetric key pair of the one or more asymmetric key pairs, wherein the first asymmetric key pair comprises a first public key and a first private key;
determining one or more cloud service providers associated with the user;
select, via the second graphical user interface component, a first cloud service provider of the one or more cloud service providers to be associated with the first asymmetric key pair;
determine one or more cloud service components associated with the first cloud service provider that are accessible to the user;
provision at least one of the one or more cloud service components with the first public key; and
configure a connection component to establish a secure connection to the at least one of the one or more cloud service components using the first private key.

11. The computing apparatus of claim 10, wherein to determine the one or more cloud service providers, the processing device is further to:
send a request to a server device for a list of cloud service providers accessible by the user;
receive the list of cloud service providers accessible to the user from the server device; and
provide the list of the cloud service providers for display in the graphical user interface.

12. The computing apparatus of claim 10, wherein to determine the one or more cloud service providers, the processing device is further to:
query a data store of cloud service providers to generate a list of cloud service providers accessible by the user; and
provide the list of the cloud service providers for display in the graphical user interface.

13. The computing apparatus of claim 10, wherein to determine the one or more cloud service components associated with the cloud service provider, the processing device is further to:
send a request to a first cloud service provider for a list of cloud service components of the first cloud service provider that are accessible to the user;
receive a response from the first cloud service provider comprising the one or more cloud service components; and provide the list of the cloud service components for display in the graphical user interface.

14. The computing apparatus of claim 10, wherein to provision the at least one of the one or more cloud service components with the public key, the processing device is further to:
select a first cloud service component from the one or more cloud service components;
send a request to the first cloud service provider to associate the first public key with the first cloud service component;
receive a response from the cloud service provider indicating whether the first cloud service component has been associated with the first public key; and
responsive to determining that the response indicates that the first cloud service component has been associated with the first public key, update the graphical user interface to indicate that the first cloud service component has been associated with the first public key.

15. The computing apparatus of claim 14, wherein to configure the connection component, the processing device is further to:
determine location information associated with the first cloud service component;
generate a mapping table entry that maps the location information to the first private key; and
store the mapping table entry in a data structure.

16. A non-transitory computer readable storage medium, having instructions stored therein, which when executed by a processing device of a computer system, cause the processing device to:
receive one or more asymmetric key pairs associated with a user, wherein each of the one or more asymmetric key pairs comprises a public key and a private key to be associated with remote access of cloud computing resources;
display, in a first graphical interface component of a graphical user interface, the received one or more asymmetric key pairs associated with the user, wherein the graphical user interface comprises the first graphical user interface component and a second graphical user interface component;
select based on an input provided in the graphical user interface, from a list of the received one or more asymmetric key pairs displayed in the first graphical user interface component, a first asymmetric key pair of the one or more asymmetric key pairs, wherein the first asymmetric key pair comprises a first public key and a first private key;
determine one or more cloud service providers associated with the user;
select, via the second graphical user interface component, a first cloud service provider of the one or more cloud service providers to be associated with the first asymmetric key pair;
determine one or more cloud service components associated with the first cloud service provider that are accessible to the user;
provision, by the processing device, at least one of the one or more cloud service components with the first public key; and
configure a connection component to establish a secure connection to the at least one of the one or more cloud service components using the first private key.

17. The non-transitory computer readable storage medium of claim 16, wherein the processing device is further to:
provide the graphical user interface for display by a client device;
display the received one or more asymmetric key pairs associated with the user as a list in the first graphical user interface component; and
receive, via the graphical user interface, a request to select the first asymmetric key pair from the list displayed in the graphical user interface.

18. The non-transitory computer readable storage medium of claim 16, wherein to determine the one or more cloud service components associated with the cloud service provider, the processing device is further to:
send a request to the first cloud service provider for a list of cloud service components of the first cloud service provider that are accessible to the user;
receive a response from the first cloud service provider comprising the one or more cloud service components; and
provide the list of the cloud service components for display in the graphical user interface.

19. The non-transitory computer readable storage medium of claim 16, wherein to provision the at least one of the one or more cloud components with the public key, the processing device is further to:
select a first cloud service component from the one or more cloud service components;
send a request to the cloud service provider to associate the public key with the first cloud service component;
receive a response from the cloud service provider indicating whether the first cloud service component has been associated with the first public key; and
responsive to determining that the response indicates that the first cloud service component has been associated with the first public key, update the graphical user interface to indicate that the first cloud service component has been associated with the first public key.

20. The non-transitory computer readable storage medium of claim 19, wherein to configure the connection component, the processing device is further to:
determine location information associated with the first cloud service component;
generate a mapping table entry that maps the location information to the first private key; and
store the mapping table entry in a data structure.

* * * * *